(12) United States Patent
Shin et al.

(10) Patent No.: US 7,925,805 B2
(45) Date of Patent: Apr. 12, 2011

(54) CRITICAL RESOURCE MANAGEMENT

(75) Inventors: George Shin, Boise, ID (US); Thomas Cooke, Peyton, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 12/258,052

(22) Filed: Oct. 24, 2008

(65) Prior Publication Data
US 2009/0193120 A1    Jul. 30, 2009

Related U.S. Application Data

(60) Provisional application No. 61/024,279, filed on Jan. 29, 2008.

(51) Int. Cl.
*G06F 3/00* (2006.01)
(52) U.S. Cl. .............................. 710/56; 710/57
(58) Field of Classification Search .............. 710/18, 710/19, 39, 52, 53, 56, 57, 112, 310; 718/104
See application file for complete search history.

(56) References Cited

U.S. PATENT DOCUMENTS

| | | | |
|---|---|---|---|
| 6,105,098 A | 8/2000 | Ninose et al. | |
| 6,170,042 B1 | 1/2001 | Gaertner et al. | |
| 6,615,215 B1 * | 9/2003 | Petty | 707/101 |
| 7,080,174 B1 | 7/2006 | Thorsbakken et al. | |
| 7,086,059 B2 | 8/2006 | Remer et al. | |
| 7,127,534 B2 | 10/2006 | Jackson et al. | |
| 7,127,568 B2 | 10/2006 | Watanabe et al. | |
| 7,225,242 B2 | 5/2007 | Cherian et al. | |
| 7,447,152 B2 * | 11/2008 | Kim et al. | 370/231 |
| 7,522,521 B2 * | 4/2009 | Bettink et al. | 370/230 |
| 2002/0091722 A1 * | 7/2002 | Gupta et al. | 707/204 |
| 2002/0103923 A1 | 8/2002 | Cherian et al. | |
| 2002/0129048 A1 * | 9/2002 | Qiu et al. | 707/204 |
| 2004/0003144 A1 | 1/2004 | Johnson et al. | |
| 2004/0148484 A1 | 7/2004 | Watanabe et al. | |
| 2004/0267916 A1 | 12/2004 | Chambliss et al. | |
| 2004/0267982 A1 | 12/2004 | Jackson et al. | |
| 2005/0240649 A1 | 10/2005 | Elkington et al. | |
| 2006/0112301 A1 | 5/2006 | Wong | |
| 2007/0083662 A1 | 4/2007 | Adams et al. | |

OTHER PUBLICATIONS

U.S. Appl. No. 12/258,117, Non-Final Rejection dated May 14, 2010, pp. 1-9 and attachments.

* cited by examiner

*Primary Examiner* — Khanh Dang

(57) ABSTRACT

In one embodiment, a method of managing critical resource usage in a storage network comprises receiving, in a storage controller, an input/output operation from a host, wherein the input/output operation identifies a storage unit, placing the input/output operation in a waiting queue, determining a maximum queue depth for at least one critical resource in the storage network required to execute the input/output command against the storage unit, and blocking one or more subsequent input/output commands from the host for the storage unit when the wait queue for the critical resource exceeds the maximum queue depth.

25 Claims, 9 Drawing Sheets

CRITICAL RESOURCE MANAGEMENT

CROSS-REFERENCE TO RELATED APPLICATION

This Utility Patent Application is based on and claims the benefit of U.S. Provisional Application No. 61/024,279 filed on 29 Jan. 2008, the contents of which are hereby incorporated by reference in their entirety

RELATED APPLICATIONS

Background

A typical, complex, resource based, computing system, such as an advanced data storage array controller, requires large pools of memory in which queues are created for the aggregation of commands and operations to increase efficiency. An example of this type of queue would be a group of memory buffers for the aggregation of data to be written to a group of disk drives, allowing for burst write operations, which are more efficient and reduce overall system latencies. As load increases on these types of complex computing systems and resources reach exhaustion, it becomes necessary to begin storing incoming commands until resources become available. The computing power required to store, manage and retrieve commands increases overall latencies and can become quite inefficient; producing additional resource starvation until he system begins to bog down. In the most extreme cases, resource starvation can increase to the point where more system resources are being utilized to manage the low resource condition than is available for the actual work that the computing system is designed to perform.

By way of example, consider the concept of resource exhaustion applied to a data storage array controller, which uses a pool of cache memory buffers to store and aggregate data to be written to a group of mechanical storage devices. Once the available pool of cache buffers has been exhausted, the array controller begins storing incoming commands in a queue and wait for more buffers to become available. As more and more commands begin to back up in the waiting queue, command latencies grow, and the requesting devices begin to exhaust their command time out values. This causes the requesting devices to then issue command abort requests to the array controller, which forces the consumption of additional resources to locate and remove commands and data from the processing queues. In the most extreme of cases, so much computing power is being used to process command abort operations that most of the commands coming into the array controller end up being aborted by the requesting device, and what appears to be a deadlock occurs. In addition to the resource exhaustion in the array controller device itself, this command backup scenario extends to the systems making the requests as well, as they are forced to handle more and more abort and retry operations on top of the ongoing workload generating the requests.

One mechanism for resource management involves the constant monitoring of usage levels of critical resources within a computing system, and the rejection of requests as they are received, which require resources that are nearing exhaustion. Rejection of commands that require the nearly exhausted resource would then continue until such time as the amount of available resource increased to an acceptable level. This approach also has the advantage of allowing the requesting systems to be aware of the fact that resource exhaustion has occurred and allows them to implement algorithms of their own to deal proactively with the exhaustion rather than reactively with command aborts and retries. This method of resource management avoids the additional resource starvation created when long latencies begin to back up a computing system and large waiting queues build up, but it has been shown in fact to create several new problems, which need to be addressed. The first problem is that this type of resource management works like an on an off switch, causing erratic system throughput and "saw tooth" performance curves. Requesting systems are ether allowed to run free, or are stopped down to executing only one command at a time. The second problem this approach creates is that one or a small number of requesting systems may consume all of the available resources in the system, thus creating possible long latencies for systems that have much lower usage levels. In usage modeling, it has been shown that the simple resource management scheme, while providing relief to the system it is running on, actually causes more problems than it solves on a system wide basis, and often results in the disabling of the feature in field installations. In some cases, specific computer operating systems perform so badly in an environment running this type of resource management scheme, that it must be disabled when systems running those operating systems are present in the environment.

BRIEF DESCRIPTION OF THE DRAWINGS

Embodiments of the invention relating to both structure and method of operation may best be understood by referring to the following description and accompanying drawings.

DETAILED DESCRIPTION

Described herein are exemplary systems and methods for critical resource management in a computer system. The methods described herein may be embodied as logic instructions stored on a computer-readable medium. When executed on a processor, the logic instructions cause a general processor to be programmed as a special-purpose machine that implements the described methods. The processor, when configured by the logic instructions to execute the methods recited herein, constitutes structure for performing the described methods.

In order to address the resource management issues described above, algorithms described herein provides a cushioning mechanism to avoid saw tooth performance curves and utilizes a fairness algorithm, which provides that all requesting systems are given a fair share of the available resources. This algorithm monitors resources and the number of active systems attempting to utilize system resources. When a critical resource usage is nearing exhaustion, remaining resources are allocated evenly by taking the total number of available resources and dividing them by the total number of active requestors. Systems that are below their allocation of resources are allowed to process requests freely, while systems that are above their allocation of resources have their requests denied. As additional resources are utilized, each requester is allocated less and less outstanding requests until, in the most extreme cases, all requestors are limited to only one request at a time.

Figure 1:
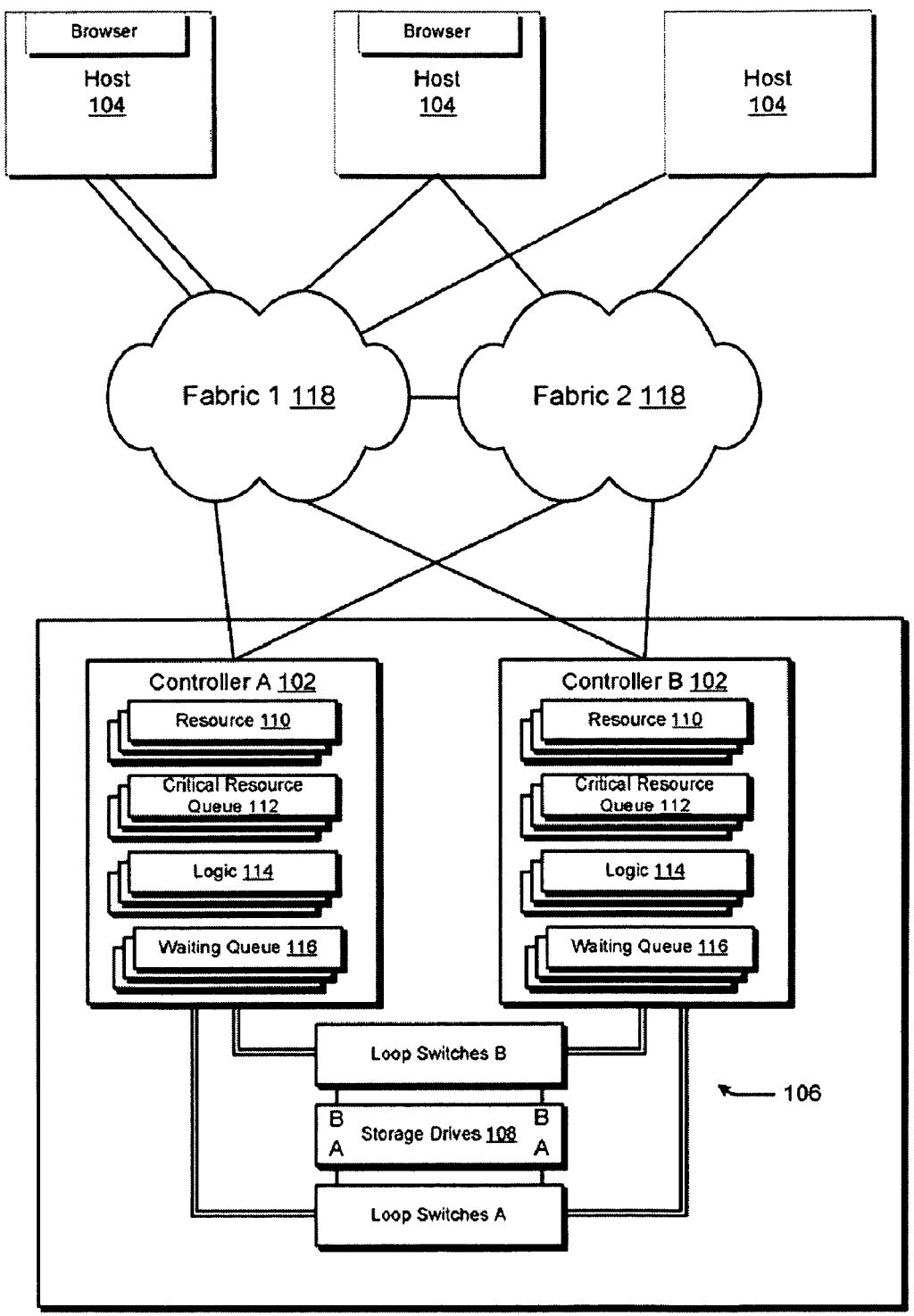
FIG. 1 is a schematic block diagram illustrating an embodiment of a storage system that is capable of improving performance with respect to overall input/output operation latency.

Referring to FIG. 1, a schematic block diagram illustrates an embodiment of a storage system 100 that is capable of improving performance with respect to overall input/output operation latency. The storage system 100 includes one or more storage controllers 102 capable of controlling data transfers between at least one host adapter 104 coupled via switching one or more switching fabrics 118 and at least one storage array 106. The storage arrays 106 typically include a large capacity of physical storage, for example in storage disk drives 108, and are configured as logical storage, generally arranged in logical units (LUNs).

The storage system further includes at least one resource 110 that is utilized in the data transfers, and at least one critical resource queue 112 respectively associated with the resource 110. Various resources may affect overall input/output latency and throughput, and thus may be considered "critical" resources. Examples of such resources include dynamic caching structures, queues, buffers, remote copy resources, cache dirty blocks, remote copy resources, disk wait queues, and others.

The critical resource queues 112 queue accesses of the associated resources 110. A logic 114, for example a processor or controller in the storage controllers 102, monitors the critical resource queues 112 for a predetermined or pre-defined high consumption condition, and identifies an adapter/LUN combination associated with a command that contributes to the high consumption condition. The logic 114 queues the identified adapter/LUN combination on a waiting queue, and prevents subsequent commands of the identified adapter/LUN combination.

In some implementations, the logic 114 subsequently detects a decline in resource consumption and dequeues the adapter/LUN combination identifier from the waiting queue, then re-enables commands of the dequeued adapter/LUN combination.

Generally, the illustrative system and technique for attaining efficient host throttling are applied for host adapters 104 that require a specific resource 110. Host adapters that do not require a specific resource generally use any available resource. Accordingly, the logic 114 can manage critical resource usage for host adapters 104 that require a specific resource 110.

In some implementations, the logic 114 detects receipt of a command from an adapter 104 to a LUN that increases consumption of a particular resource 110 that is concurrently burdened by multiple executing commands to a level above a limit or threshold, and sets a flag indicative of a critical condition of the resource. Implementations may detect increased consumption according to various other high consumption criteria such as an increased rate of command delivery, a preponderance of particular types of burdensome traffic, or other conditions that may be detected with additional analysis.

In some embodiments, the logic 114 detects increased consumption of a particular resource 110 to a level above the pre-selected limit, and queues an identifier of the adapter/LUN combination on a waiting queue 116 associated with the resource 110. The logic 114 can also detect a decline in consumption of the resource 110. In response to a decline in consumption, the logic 114 removes an adapter/LUN combination identifier from the waiting queue 116 in the queue order and enables subsequent commands of the adapter/LUN combination removed from the waiting queue 116.

Various criteria may be tracked to monitor consumption. For example, a decline in consumption may be discernible simply as a decrease in queue depth below a limit or threshold. In a particular implementation, the waiting queue 116 may be freed more aggressively as the queue becomes less full, a technique that is possible because freeing of a waiting queue does not necessarily generate another usage of the critical resource. For example, if the critical resource is nearly in a critical state with a queue depth D, and the current queue depth after returning a resource is C, then the number of adapter/LUN combinations freed can be D-C.

Figure 2:
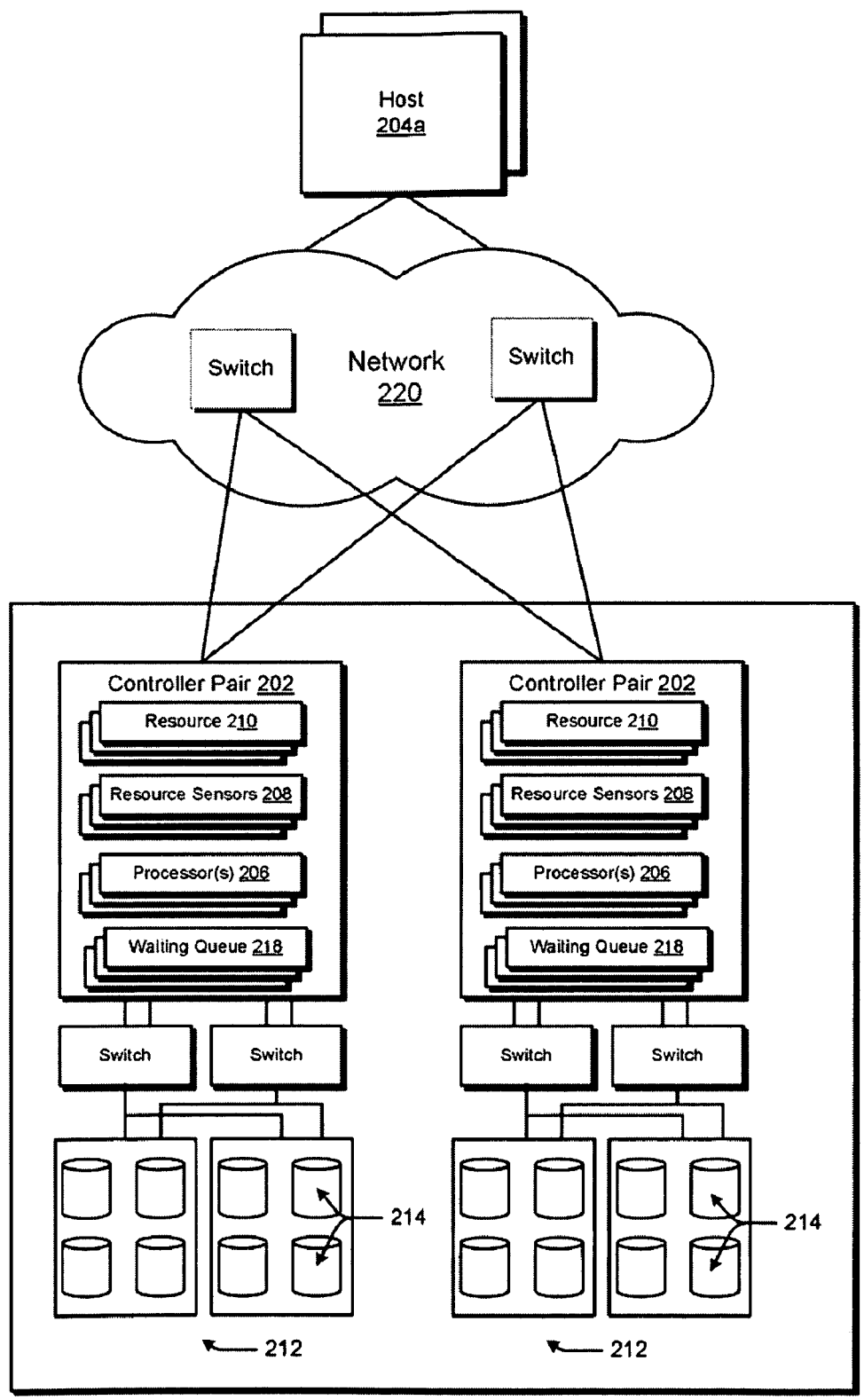
FIG. 2 is a schematic block diagram depicting an alternative embodiment of a storage system that includes a resource management system to enable a storage controller to throttle host input/output activity.

Referring to FIG. 2, a schematic block diagram illustrates an embodiment of a storage system 200 that includes a resource management system to enable a storage controller 202 to manage host input/output activity. In some embodiments, the resource management system enables a controller 202 to throttle host input/output traffic that specifies usage of a particular internal resource when that resource is heavily utilized. In a particular embodiment, only those host adapters 204, also called hosts, that specify the particular resource are constrained to wait for availability of the resource. The resource management system implements a "fairness" technique that enables each host 204 to perform input/output commands in the order of command denial as resources again become available.

The resource management system typically responds to input/output commands rejected due to resource starvation by returning either a QUEUE FULL or BUSY response, depending on the definition of the particular invoked operating system.

For hosts that may have unsatisfactory performance in response to resource management system behavior, some embodiments may allow the resource management system to be disabled for all host types.

The storage system 200 and associated resource management system may be extensible to enable addition of sensors.

In an illustrative embodiment, the resource management system can execute in processors 206 internal to the storage controllers 202. Controller routines that result in consumption of any monitored critical resources execute a macro, called a resource-use macro. A "critical" resource is one that degrades latency performance in high usage conditions. Controller routines that free such a critical resource execute a macro, called a resource-free macro.

The resource management system defines one or more resource sensors 208. Individual resource sensors 208 use an indexed structure to monitor associated respective resources 210. In some embodiments, the resource sensor structure contains a current count of resources consumed, a maximum quota value for that particular resource and pointers to the first and last entry in a waiter queue. Multiple sets of macros can be defined and used to enable manipulation of the use count, resources required, and the waiter queue. An example of a resource sensor structure is shown as follows:

```
typedef struct _critical_resource
{
ushort cur;   /* Current queue count */
ushort max;   /* Maximum queue count */
ulong qfirst; /* First waiter */
ulong qlast;  /* Last waiter */
} critical_resources;
```

Each resource sensor structure maintains a maximum value for the specific resource that is monitored, a parameter that indicates the number of connections waiting for this resource, and a parameter for the maximum queue depth for the resource on the controller that houses the resource sensor structure. The resource sensor structure may also maintain a parameter for the maximum queue depth for the resource on a peer controller.

If consumption of a specific resource exceeds the specified limit, a corresponding bit is set in the critical resources flag indicating that the resource is near exhaustion. Upon receipt of a command requiring a specific resource that has exceeded the predetermine quota, critical resource management procedures place commands in a waiting queue. In the illustrative embodiment, the storage controller 202 controls one or more storage arrays 212 that include a plurality of storage drives 214. The storage arrays 212 and drives 214 make up physical storage that can be configured as logical storage in logical units (LUNs). The adapter 204 and LUN are termed an "adapter/LUN combination". An index identifying the specific adapter/LUN combination is placed on a waiting queue 218 to wait for more resources to become available.

As resources 210 become available, adapter/LUN combinations are removed from the waiting queue 218 and allowed to perform additional input/output commands. An exhausted bit for a specific resource remains set until the last adapter/LUN combination is removed from the waiting queue 218, enabling the system's input/output command pipeline to drain a suitable amount before additional heavy input/output loading resumes. An aspect of the behavior is that a host adapter 204 may return from the queue, perform a predetermined number of additional successful input/output commands, and then be placed back at the end of the queue again. In an illustrative embodiment, one additional command is performed.

In a particular system embodiment that includes Small Computer Systems Interface (SCSI) functionality, a storage controller 202 can receive commands from an adapter 204, for example at HP$NEW, a host port entry for SCSI commands received from an adapter 204. HP$NEW performs operations such as validating commands for execution. One example of a validation operation is checking of flags or bits to determined whether the command is to be disabled due to the high consumption condition. At a point in HP$NEW at which a command is validated sufficiently that the command is to be executed, and the command is determined to be a READ or WRITE operation, the critical resource flags or bits are examined to determine whether a required resource has reached a limit or quota. If a required resource is exhausted, as determined by the critical resource bits, a disable flag or bit is set to indicate that no additional WRITE and/or READ input/output operation is to be allowed through the particular adapter/LUN combination. A macro, for example CR_QUEUE_WAITER, is executed to place the adapter/LUN combination on the waiting queue 218. The command in the process is then allowed to proceed normally through the execution pipeline. At an earlier point in execution of HP$NEW, for example after precursory checks for the command are performed, additional input/output traffic is diverted from an execution critical path to HP$NEW_UNUSUAL, which queues commands blocked by a busy status of a resource, thereby reducing or minimizing processing of the blocked commands.

In an illustrative system, macros are supplied for manipulation of the resource sensor current queue count.

CR_USE_WR_RESOURCE (CR_IDX) is a resource sensor current queue count manipulation macro that enables a command to use a Write resource. CR_IDX is an index identifier of the pertinent critical resource. The macro increases the queue count and checks for critical usage.

CR_USE_RW_RESOURCE (CR_IDX) is a resource sensor current queue count manipulation macro that enables a command to use a Read/Write resource. CR_IDX is an index identifier of the pertinent critical resource. The macro increases the queue count and checks for critical usage.

CR_FREE_WR_RESOURCE (CR_IDX) is a resource sensor current queue count manipulation macro that frees a Write resource.

CR_FREE_RW_RESOURCE (CR_IDX) is a resource sensor current queue count manipulation macro that frees a Read/Write resource.

Some macros are resource required manipulation macros.

CR_SET_RESOURCE_IN_USE (CR_IDX, UNIT) is a resource required manipulation macro specifying that the particular UNIT requires a specific resource. UNIT identifies a particular adapter 204 or other device, operating as a client. The macro identifies the specific client and the specific resource that is required for use by the client.

CR_FREE_RESOURCE_IN_USE (CR_IDX, UNIT) is a resource required manipulation macro that indicates the particular UNIT does not require a specific resource. Accordingly, the adapter or other client identified by UNIT is dissociated from the specific resource.

CR_CLEAR_DRM_TUNNEL_RESOURCE (UNIT) is a resource required manipulation macro that indicates the particular UNIT requires no Digital Resource Management (DRM) Tunnel resources.

Other macros are waiting queue manipulation macros.

CR_QUEUE_WAITER (ACB, LUN, CR_MASK, LW) is a waiting queue manipulation macro that adds an adapter/LUN combination to the waiting queue 218 for the resource specified in CR_MASK/LW. ACB is an index to the adapter control block and LUN identifies the logical unit for the pertinent adapter/LUN combination.

CR_FREE_RW_WAITERS (CR_IDX, COUNT) is a waiting queue manipulation macro that removes a number of adapter/LUN combinations identified by the COUNT field from the waiting queue 218. The identified adapter/LUN combinations are waiting for the waiting queue 218 associated with the critical resource identified by the CR_IDX field. The macro also clears both Read and Write flags when the last waiting adapter/LUN combination index is removed from the waiting queue 218.

CR_FREE_ALL_RW_WAITERS (CR_IDX) is a waiting queue manipulation macro that frees all adapter/LUN combinations waiting for the critical resource identified by the CR_IDX field, and clears both Read and Write flags when the last waiting adapter/LUN combination index is removed from the waiting queue 218.

CR_FREE_RW_WAITERS (CR_IDX, COUNT) is a waiting queue manipulation macro that removes the number of adapter/LUN combinations identified by the COUNT field from the waiting queue 218. The identified adapter/LUN combinations are waiting for the waiting queue 218 associated with the critical resource identified by the CR_IDX field.

The macro also clears the Write flag when the last waiting adapter/LUN combination index is removed from the waiting queue 218.

CR_FREE_ALL_WR_WAITERS (CR_IDX) is a waiting queue manipulation macro that frees all adapter/LUN combinations waiting for the critical resource identified by the CR_IDX field, and clears the Write flag when the last waiting adapter/LUN combination index is removed from the waiting queue 218.

Various resources 210 may be managed using the disclosed techniques, depending on constituent devices, components, and characteristics of the data handling system. Sensors 208 implemented in a particular embodiment include Data Replication Manager (DRM) tunnels for peer-to-peer data replication, cache dirty block waiting queues, and disk unit waiting queues. Indices can be allocated for subsequent addition of sensors.

DRM tunnels have limited resources for transferring write commands from a digital resource source to a digital resource destination. As the number of writes to the controller 202 that are to be replicated increases, the tunnel depletes resources and further write commands are queued to a DRM tunnel resource queue, one of the critical resources in the system 200.

Cache dirty block waiting queues can be another critical resource 210. Write commands are accepted by the controller 202, placed in a controller cache as dirty data, and later flushed to disks 214 in the storage array 212. The controller 202 limits the amount of "dirty" data that the cache may contain. Once the limit is reached, additional write commands are queued, waiting for a cache flush to reduce the level of dirty data.

Management of the critical resources waiting queue 218 is performed using the Adapter Control Block (ACB) index and logical unit (LUN) of a specific input/output path to form a pointer into a fixed-size, pre-allocated table. Once an adapter/LUN combination has used some amount of a critical resource, the adapter/LUN combination is queued to the critical resource waiting queue 218. Each critical resource 210 has an associated critical resource waiting queue 218. A particular implementation has five queues, four allocated to digital resource tunnels and one to cache dirty block waiting queues. When a critical resource becomes available for use, the adapter/LUN combination is dequeued.

The resource management system can be implemented to return a SCSI status of either QUEUE FULL or BUSY in response to commands for which a resource designated as required has reached the consumption quota or limit. Default behavior can be to return a QUEUE FULL status to such commands. An alternate status of BUSY can be returned by specification by the Host Mode of the adaptor executing the command.

Some adaptors may include a control capability to enable and disable resource management system functionality.

FIG. 2 illustrates a storage system 200 that includes controllers 202 arranged in pairs, and including multiple storage arrays 212 and controller pairs. The resource management system can be implemented in either or both controllers in a pair, or in a remote controller 202 via a network 220. Inter-controller resource management can be implemented in a continuous access configuration to prevent input/output traffic on a client, such as an adapter, from overwhelming a server. Inter-controller resource management also can be implemented to fairly allocate access of clients to a server.

Figure 3:
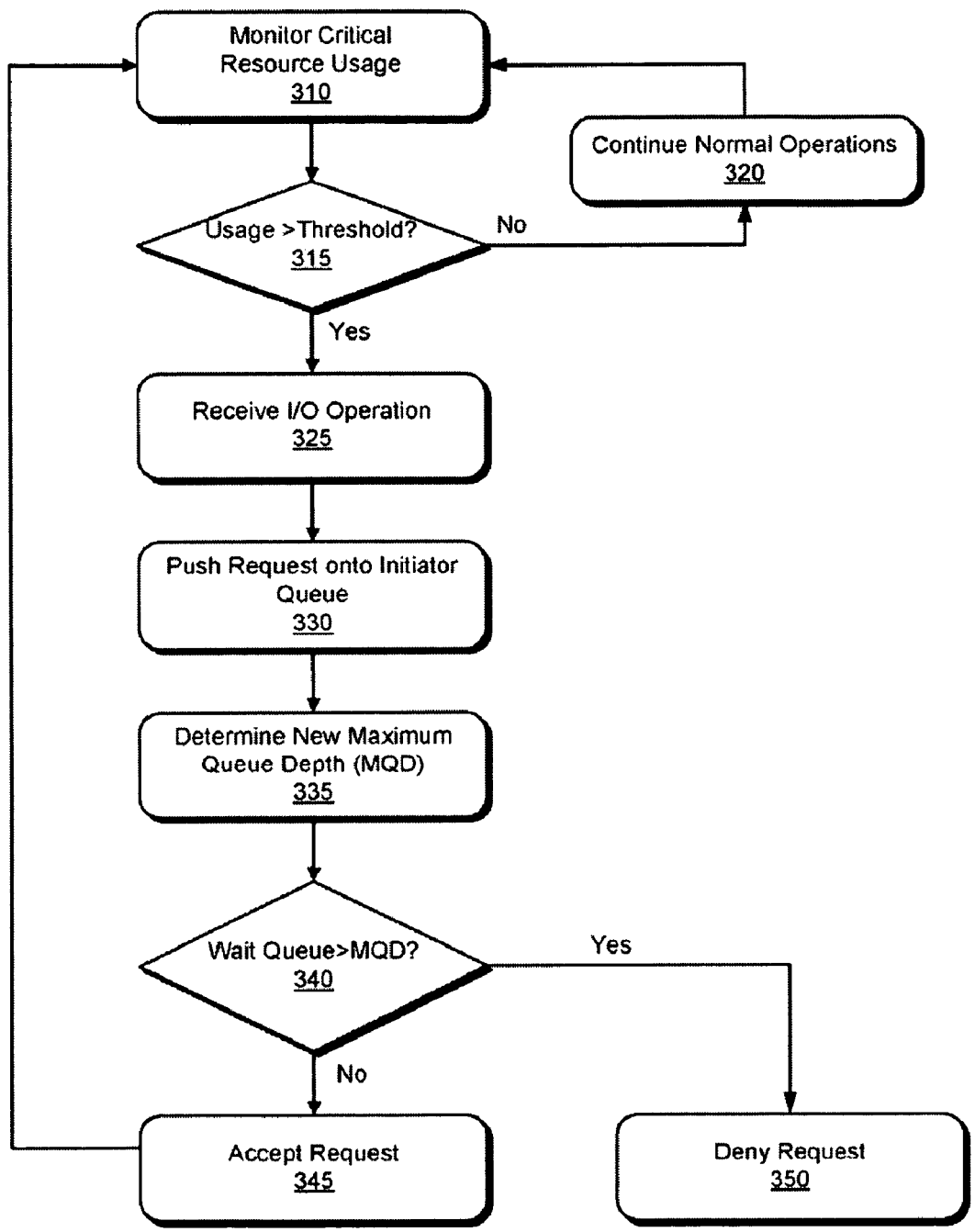
FIG. 3 is a flow chart showing an embodiment of a method capable of usage by a data handling system for managing critical resource usage.

Referring to FIG. 3, a flow chart depicts an embodiment of a method 300 capable of usage by a data handling system for managing critical resource usage. The method can be performed on a controller or processor that executes resource management functionality in a data path or pipeline between one or more clients and one or more servers. The method executes over time and, at operation 310 monitors the usage of one or more critical resources. For example, in one embodiment the queue depth in at least one critical resource queue may be monitored to detect resource consumption greater than a threshold. If, at operation 315, the critical resource usage fails to exceed a threshold, control passes to operation 320 and the storage controller continues normal operations.

By contrast, if at operation 325 the usage exceeds the threshold, then the storage controller enters a critical resource management mode. Control then passes to operation 325 and an input/output operation is received from a host computer such as, e.g., host 204 depicted in FIG. 2. The input/output operation identifies the host computer that originated the request and a storage unit (e.g., a logical unit or LUN) against which the input/output operation is to be executed.

At operation 330 the input/output operation is pushed onto a queue of initiators which are requesting input/output operations during a resource shortage condition. At operation 335 a new maximum queue depth (MQD) for the resource is determined. In some embodiment the MQD is determined by dividing the number of available resources by the number of initiators (i.e., commands) waiting for the resource. The total number of available commands is reduced by the amount that the count of resources used exceeds the maximum allowed before the MQD calculation. If the count of resources used exceeds the maximum by fifty percent, then the MQD is set to one.

Once the MQD is determined, control passes to operation 340. If, at operation 340, the wait queue depth for the resource identified in the input/output operation does not exceed the MQD, then control passes to operation 345 and the input/output operation is accepted. Control then passes back to operation 310.

By contrast, if at operation 340 the length of the wait queue exceeds the MQD, then the input/output operation request is denied. In some embodiments, the storage controller may transmit a message to the host indicating that the input/output operation has been blocked.

When resource consumption declines and normal operations are resumed, the client/server combination identifier may be removed from the waiting queue in queuing order. Commands of the client/server combination are re-enabled. In a particular embodiment, commands of a client/server combination are re-enabled in order of queuing as resource availability is restored.

A typical resource management implementation manages critical resource usage for clients that require usage of a specific resource. For example, a client not requiring a specific resource typically can use any available resource.

In a particular embodiment, the method can be implemented in a storage system that includes one or more storage controllers, one or more host adapters operational as clients, and one or more storage arrays configured as physical storage and logical storage. The logical storage can be arranged in logical units (LUNs) that are operational as servers. An adapter/LUN combination is operational as a client/server combination. Resources for the storage system may include dynamic caching structures, queues, buffers, remote copy resources, cache dirty blocks, disk wait queues, and others, depending on the particular system configuration.

Figure 4A:
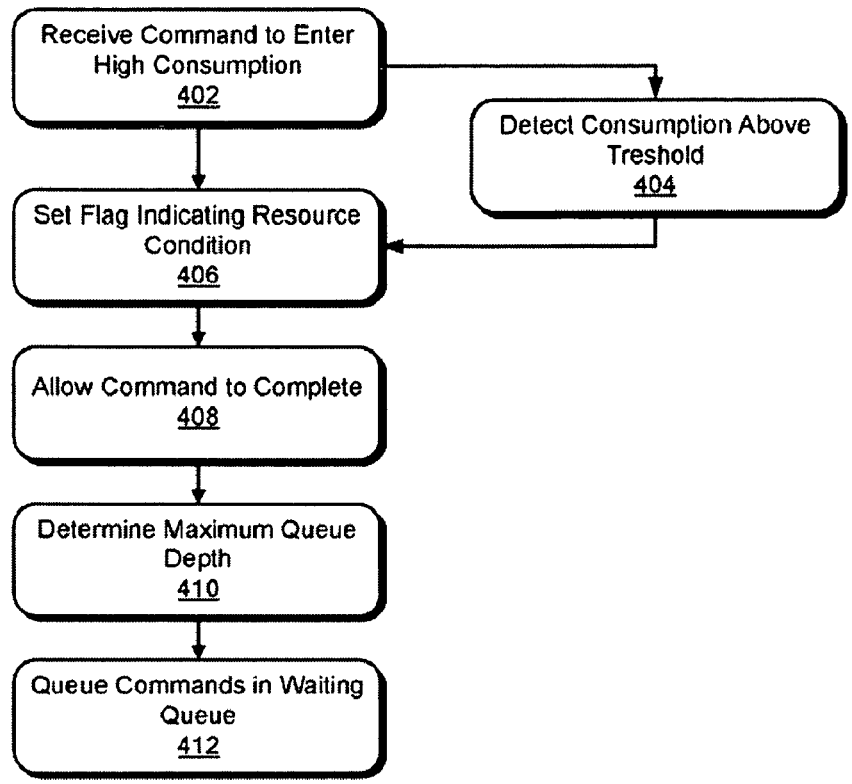
FIGS. 4A and 4B are flow charts that depict another embodiment of a method capable of usage by a data handling system for managing critical resource usage.
Figure 4B:
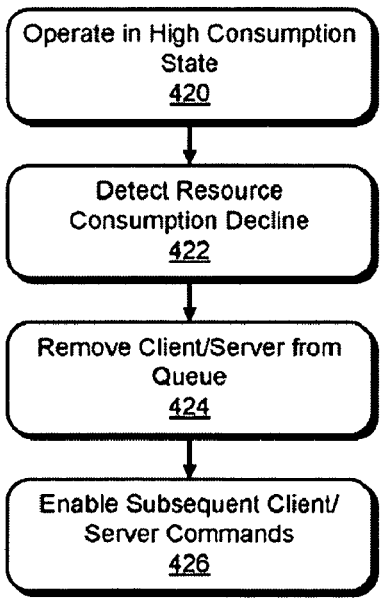

Referring to FIGS. 4A and 4B, flow charts depict another embodiment of a method 400 capable of performance by a data handling system for managing critical resource usage.

The method implements resource management functionality in a data path or pipeline between one or more clients and one or more servers. Referring to FIG. 4A, a command from a client to a server is received 402 that increases consumption of a resource to a high consumption condition, which may be termed a "critical" condition. For example, a resource manager can detect 404 an increase in consumption of a resource above a threshold. The resource manager sets 406 a flag indicative of a critical condition for the resource. The resource manager allows 408 the command to complete and determines 410 a maximum queue depth for the resource, then queues 412 commands in a waiting queue when the maximum queue depth exceeds a threshold.

Referring to FIG. 4B, generally when the resource manager is managing a resource in a high consumption state 420, the resource manager may detect 422 a decline in consumption of the resource. In response to reduced consumption, a client/server combination identifier is removed 424 or popped from the waiting queue in the queue order. Subsequent commands of the client/server combination that is removed from the waiting queue are enabled 426.

Some host types may be able to handle the Queue Full or Busy response generated by the critical resource management operations. Thus, in some embodiments the firmware checks the adapter to determine whether a DISABLE_CRITICAL_RESOURCE_MGM bit is set. If any Adapters with LUNs presented have this bit set, the entire CRM system is disabled. Conversely if no Adapters with LUNs presented have this bit set, the CRM system is reactivated.

With the addition of Active/Active Host Port functionality, CRM has been extended so that both controllers work in unison to block I/O when a critical resource is exhausted. In some embodiments, critical resource monitoring is done only on the master controller and information about critical resource shortages is sent to the proxy controller via an MFC packet when shortages are detected or resources become available again. When a command is being processed in the proxy side, critical resources required to process the command on the master side are checked. If a shortage is detected, the access bits for the Adapter/LUN combination on the proxy side are updated to block further I/O that requires the specific resource. A flag is set in the MFC that may be used to send the command to the master controller indicating that this has been done. When a proxy command MFC is received and processed on the master controller, critical resources are checked, and if found to be still exhausted, the Adapter/LUN combination is placed on the CRM waiter queue and the command is then processed normally. When the required resource is no longer exhausted and an Adapter/LUN combination is removed from the waiter queue on the master controller, an MFC is sent to the proxy controller, and the Adapter/LUN combination is unblocked on that side as well.

The various functions, processes, methods, and operations performed or executed by the system can be implemented as programs that are executable on various types of processors, controllers, central processing units, microprocessors, digital signal processors, state machines, programmable logic arrays, and the like. The programs can be stored on any computer-readable medium for use by or in connection with any computer-related system or method. A computer-readable medium is an electronic, magnetic, optical, or other physical device or means that can contain or store a computer program for use by or in connection with a computer-related system, method, process, or procedure. Programs can be embodied in a computer-readable medium for use by or in connection with an instruction execution system, device, component, element, or apparatus, such as a system based on a computer or processor, or other system that can fetch instructions from an instruction memory or storage of any appropriate type. A computer-readable medium can be any structure, device, component, product, or other means that can store, communicate, propagate, or transport the program for use by or in connection with the instruction execution system, apparatus, or device.

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

Figure 5:
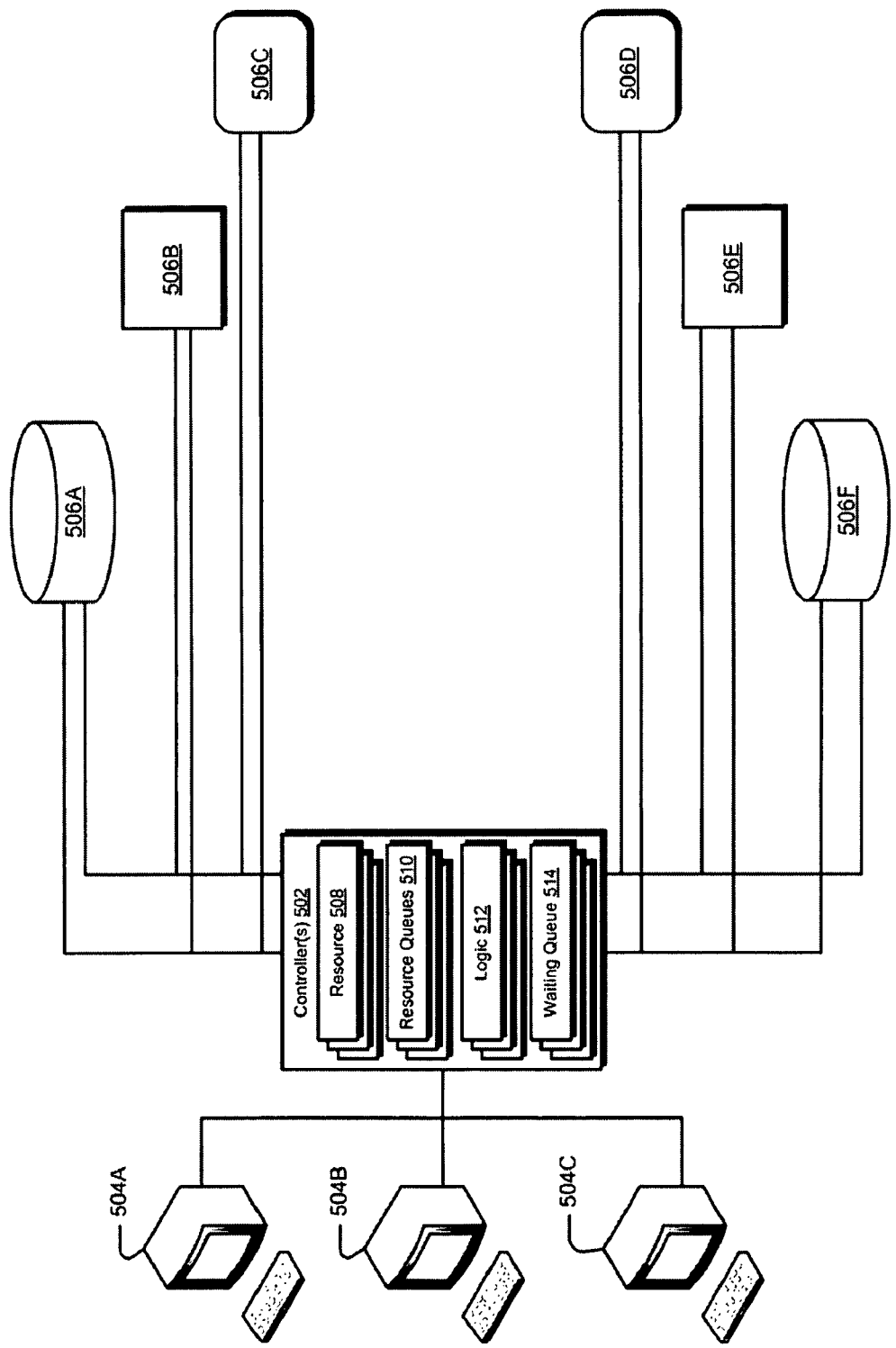
FIG. 5 is a schematic block diagram illustrating an embodiment of a data handling system including one or more controllers capable of controlling data transfers between at least one client and at least one server.

Referring to FIG. 5, a schematic block diagram illustrates an embodiment of a data handling system 500 that includes one or more controllers 502 capable of controlling data transfers between at least one client 504A-C and at least one server 506A-F. The system further includes one or more resources 508 for usage in performing data transfers and one or more critical resource queues 510 that are respectively associated with the resources 508 and can queue accesses to the associated resource 508. The system 500 further includes a logic 512, such as a processor or central processing unit (CPU), controller, and the like. The logic 512 executes various operations such as a resource management operation. In a particular example, the logic 512 monitors the critical resource queues 510 to detect a predetermined high consumption condition. The logic 512 identifies a source/client combination associated with a command that contributes to the high consumption condition and queues the identified source/client combination on a waiting queue 514. For a queued source/client combination, the logic 512 prevents subsequent commands for the identified source/client combination.

In various data handling system implementations, the controllers 502 can take several forms, such as data hubs, routers, bridges, storage controllers, communication controllers, network management devices, and the like. Similarly, the clients 504A-C may similarly be in different forms such as computers, hosts, adapters, on-line terminals, point-of-sale terminals, laptop computers, palm computers, Asynchronous Transfer Mode (ATM) terminals, and many others. Also, the servers 506A-F may be different types of server devices capable of performing a variety of services for the clients. Some systems 500 may include many different server types. Others may include only a single server type. Any suitable type of servers 506A-F may be included in the data handling system including various storage system servers such as storage arrays or logical units (LUNs), or in various database servers, communication servers, computing system servers, and the like.

In some implementations, the logic 512 detects receipt of a command from a client 504A-C to a server 506A-F that increases consumption of a resource 508 to a level above a preselected limit. If so, the logic 512 sets a flag indicative of a high consumption condition, for example called a critical condition, of the resource 508. The logic 512 allows the received command to complete, and rejects subsequent commands issued by the client 504A-C to the server 506A-F.

Also in some implementations, the logic 512 may detect an increase consumption of a resource 508 to a level above the preselected limit and queue an identifier of the client/server combination on a waiting queue 514 associated with the resource 508. The logic 512 may also detect a decline in consumption of the resource 508 and respond by removing a client/server combination identifier from the waiting queue 514 in the order in which the identifiers were placed on the queue. The logic 512 enables subsequent commands of the client/server combination removed from the waiting queue 514.

A critical resource management system may be implemented in a storage area network controller or controllers which cooperate in a storage system such as either of the storage systems depicted in FIG. 1 or FIG. 2. In some embodiments, a storage system may be adapted to use SCSI commands and interfaces. Therefore, commands may be characterized by an initiator-target-logical unit (I_T_L) nexus, or an initiator-target nexus, or an initiator-logical unit nexus.

In some embodiments, a critical resource management system as described herein is constructed to identify a number, n, of critical path write resources and critical path read resources, which may be designated $CR_n$. Each critical path resource CRi is assigned an index, i, into a critical resource (CR) bit array maintained by the critical resource management system and stored in a suitable memory location.

Each logical disk, or logical unit, is associated with a critical resource bit array (required_resource[]) which tracks the required resources to satisfy read operations and write operations directed to the logical disk. In addition, the system maintains to global critical resource bit arrays: a first bit array (write_critical[]) to track whether a particular write bound resource has been exhausted, i.e., whether there is a shortage of critical resources to satisfy a write request, and a second bit array (read_critical[]) to track whether a particular read bound resource has been exhausted.

Each critical path resource ($CR_i$) is assigned a critical resource management software meant which represents a cutoff point for the resource. If the soft limit is exceeded, then the resource is automatically marked as being exhausted. In addition, the system tracks outstanding, active host commands waiting to use each critical resource and maintains a list of blocked I_L nexuses in which the initiator-logical unit is set to a "no resource" condition to prevent additional commands on the initiator-logical unit nexus from forming a task set.

In some embodiments, the critical resource management system provides a set of functions which operate on the parameters described above when a monitor critical resource ($CR_i$) is consumed by a host command waiting to use the resource, and when the critical resource is released (i.e., freed) by one or more routines within a storage controller. In addition, the critical resource management system provides an operation to mark a given critical resource as being exhausted, and then operation to free a waiting initiator-logical unit nexus when a critical resource becomes available to the input-output operation which requires the initiator-logical unit nexus. In some embodiments, the critical resource management system further provides a function to place a particular initiator-logical unit nexus on the critical resource waiter queue and to remove the initiator-logical unit nexus from the queue. Further, the critical resource management system implements an operation that places a host command in a busy status when the host command is running on an initiator-logical unit nexus that is blocked for lack of a critical resource available.

In some embodiments, the critical resource management system implements routines to support access fairness to hosts utilizing a particular active read and write resource. For example, the critical resource management system monitors active read queue depths (rqd) and write command queue depths (wqd), and calculates a maximum queue depth (mqd) for each critical resource. In addition, the number of initiator-logical unit nexuses blocked due to unavailable resources is tracked.

In some embodiments, the critical resource management system implements operations which permit redundant controllers to cooperate in managing critical resources. For example, the critical resource management system may create duplicate critical resource masks to include remote side and data. In addition, the critical resource management system may implement operations to share critical resource management parameters between controllers and to check resources available on proxy, or secondary, controllers. Further, the critical resource management system may check incoming proxied commands in the master controller, and if applicable may synchronize the current initiator-logical unit nexus has unblocked at the proxy side.

By way of overview, each time a read operation or a write operation is processed, the respective read queue depth (rqd) or write queue depth (wqd) is incremented for the initiator-target nexus. Similarly, these values are decremented when the read command or write command is retired. This permits the system to check write commands against the write queue depth when write resources are exhausted and to check read commands against the read queue depth when read resources are exhausted.

Each time a new initiator-logical unit waiter is added to the critical resource management queue, the number of waiters for that resource is incremented, and a new maximum queue depth (mqd) is calculated by dividing the available resources by the number of initiators that are waiting. The total number of available commands is reduced by an amount that the count of resources used exceeds the maximum allowed number of resources, before the maximum queue depth calculation. If the count of resources used exceeds the maximum by a threshold amount, then the maximum queue depth is set to one. In one embodiment, the threshold is set at fifty percent. If the system operates in a redundant controllers setting, then the maximum queue depth may be transmitted to the redundant controller via a local mirroring path for use with commands for this controller that are received on the other controller.

When a command is received and is determined to require a resource that is exhausted, the initiator-logical unit nexus is placed in the critical resource waiter queue. The command is completed, and the function is called to queue the waiter, and calculate a new maximum queue depth. When a subsequent command arrives which requires the resource, the queue depth of value for the initiator-target nexus combination is checked against the maximum queue depth for the resource and the command is rejected if the initiator-target access has exceeded the maximum queue depth for the resource allocated to each host. In redundant controller configurations, commands received on the proxy controller use the maximum queue depth calculated for the other controller.

Various operations of a critical resource management system are explained with reference to FIGS. 6A, 6B, and 7-8, which are flow charts that depict embodiments of methods capable of usage by a data handling system for managing critical resources.

Figure 6A:
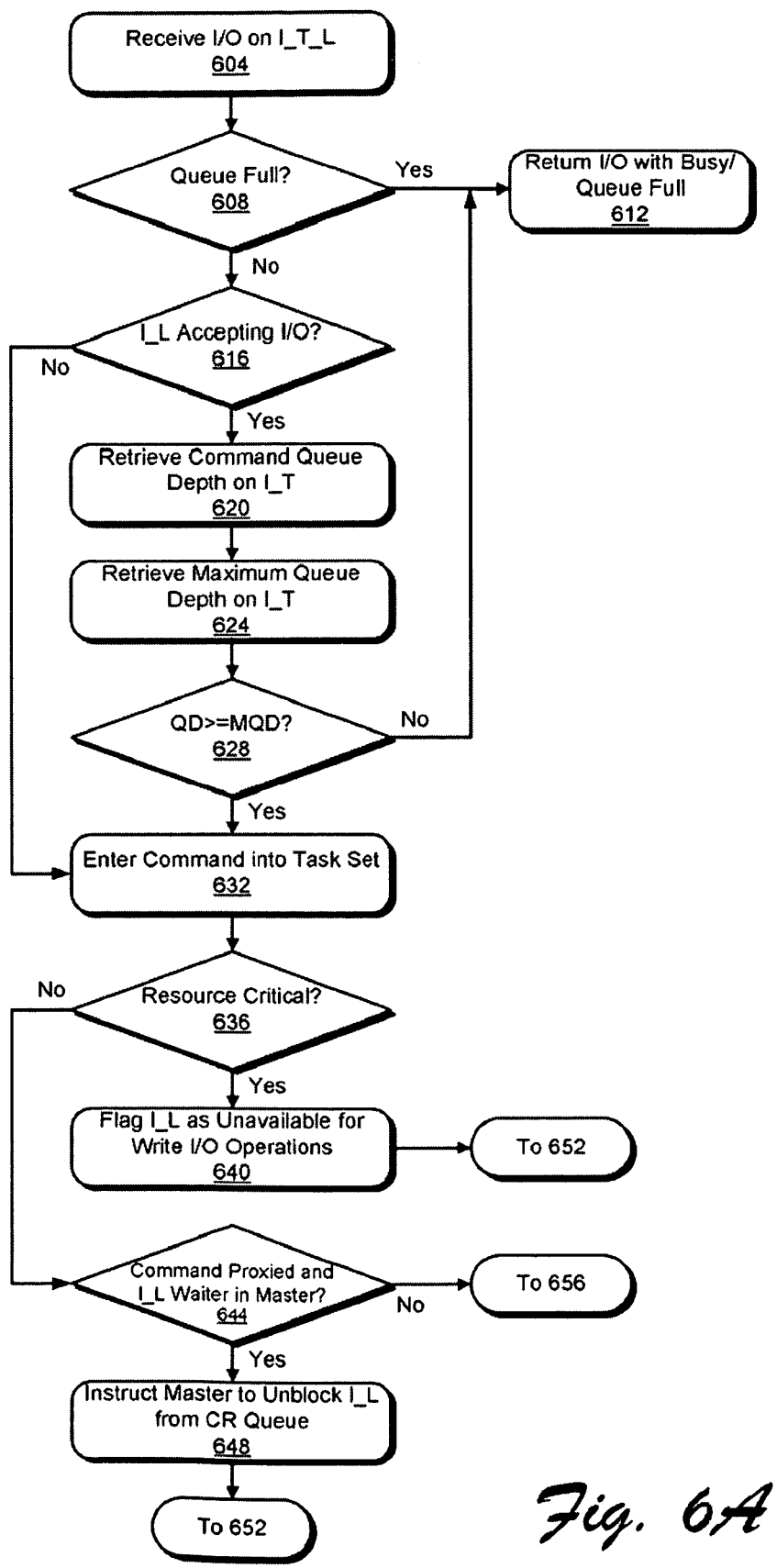
FIGS. 6A, 6B, and 7-8 are flow charts that depict another embodiment of a method capable of usage by a data handling system for managing critical resources.
Figure 6B:
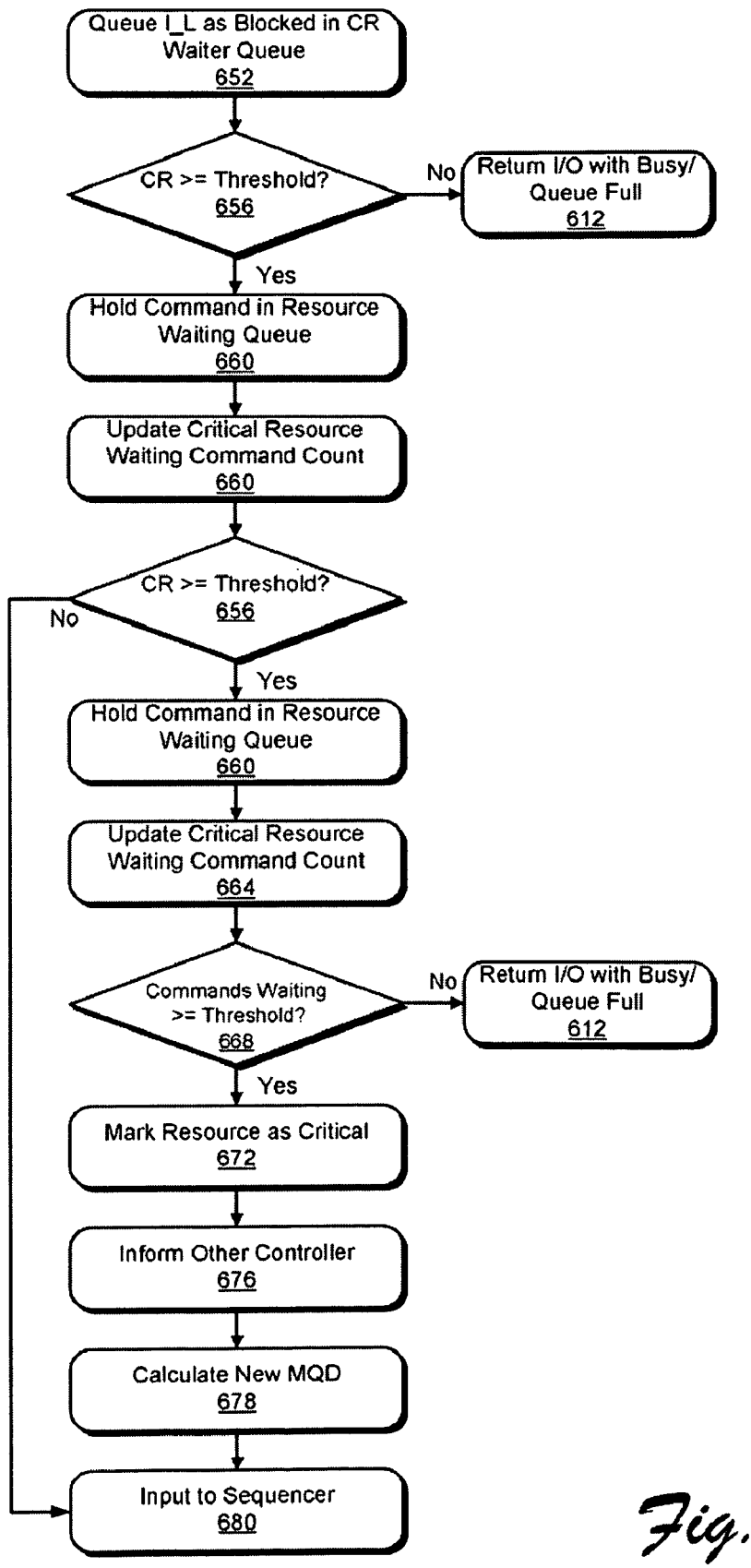

Referring first to FIGS. 6A-6B, at operation 604 a host input and output operation is received on an initiator-target-logical unit nexus. If, at operation 608 the queue is full then control passes to operation 612 and the input/output operation is returned with a busy/queue full error message. By contrast: if at operation 608 the queue is not full then control passes to operation 616.

If, at operation 616 the initiator-logical unit nexus is not in a condition to accept input/output operations then control passes to operation 632 and the command is entered into the task set, i.e., added to the host command queue. By contrast, if at operation 616 the initiator logical unit nexus is accepting input output operations then control passes to operation 620 and the command queue depth for the initiator-target nexus is retrieved from memory. As described above if the input/output command received in operation 604 is a write command then the write command depth (wqd) is retrieved from memory. By contrast, if the input/output command received in operation 604 is a read command then the read command depth (rqd) is retrieved from memory.

At operation 624 the maximum queue depth (mqd) for a required critical resource is retrieved from memory. As described above, in the context of redundant controllers one controller is commonly designated as a master controller and the other controller is designated as a proxy controller. In this context the maximum queue depth corresponds to the maximum queue depth for the master controller. Therefore, in the event that the input/output operation received in operation 604 is directed to the proxy controller, the proxy controller retrieves the maximum queue depth from the master controller.

If, at operation 628, the queue depth (i.e., the wqd or the rqd) retrieved from memory does not exceed the maximum queue depth then control passes to operation 612 and the input/output operation is returned with a busy/queue full error message. By contrast, if the queue depth retrieved from memory exceeds the maximum queue depth than control passes to operation 632 and the command is entered into the task set, i.e., added to the host command queue.

If, at operation 636 the resource is marked as critical then control passes to operation 640 and the initiator-logical unit nexus is flagged as unavailable for write input/output operations, i.e., a no write resource condition is set and control them passes to operation 644. By contrast, if at operation 636 the resource is not marked as critical control passes directly to operation 644.

If, at operation 644 the command was received at a proxy controller and there are initiator-logical unit waiters in the master controller then control passes to operation 648 and the proxy controller instructs the master controller to unblock the initiator-logical unit nexus from the critical resource queue, and control passes to operation 652. Otherwise, control passes to operation 656.

Referring now to FIG. 6B, at operation 652 via initiator-logical unit nexus is queued up as being blocked in the critical resource waiter queue as being in a no write resource condition. In addition the initiator-logical unit waiters count in the critical resource queue is updated and the maximum queue depth is recalculated based on the new waiters.

If, at operation 656, the critical resource has not reached a maximum threshold, then control passes to operation 680 and the input/output operation is the input to the sequencer, which schedules the operation for execution. By contrast, if at operation 656 the critical resource has reached or exceeded a maximum threshold than control passes to operation 660 and the current command is held in a resource waiting queue. At operation 664 the count of commands waiting for critical resources is updated, i.e., incremented.

If, at operation 668 the number of commands waiting for a critical resource does not exceed a threshold then control passes to operation 680 and the input/output operation is the input to the sequencer, which schedules the operation for execution. By contrast, if at operation 668, the number of commands waiting for a critical resource exceeds a threshold then control passes to operation 672 and the resource is marked as critical. In a redundant controller context the controller informs the other controller that the resource is critical (operation 676). At operation 678 a new maximum queue depth is calculated, and at operation 680 the command is input to the sequencer.

Figure 7:
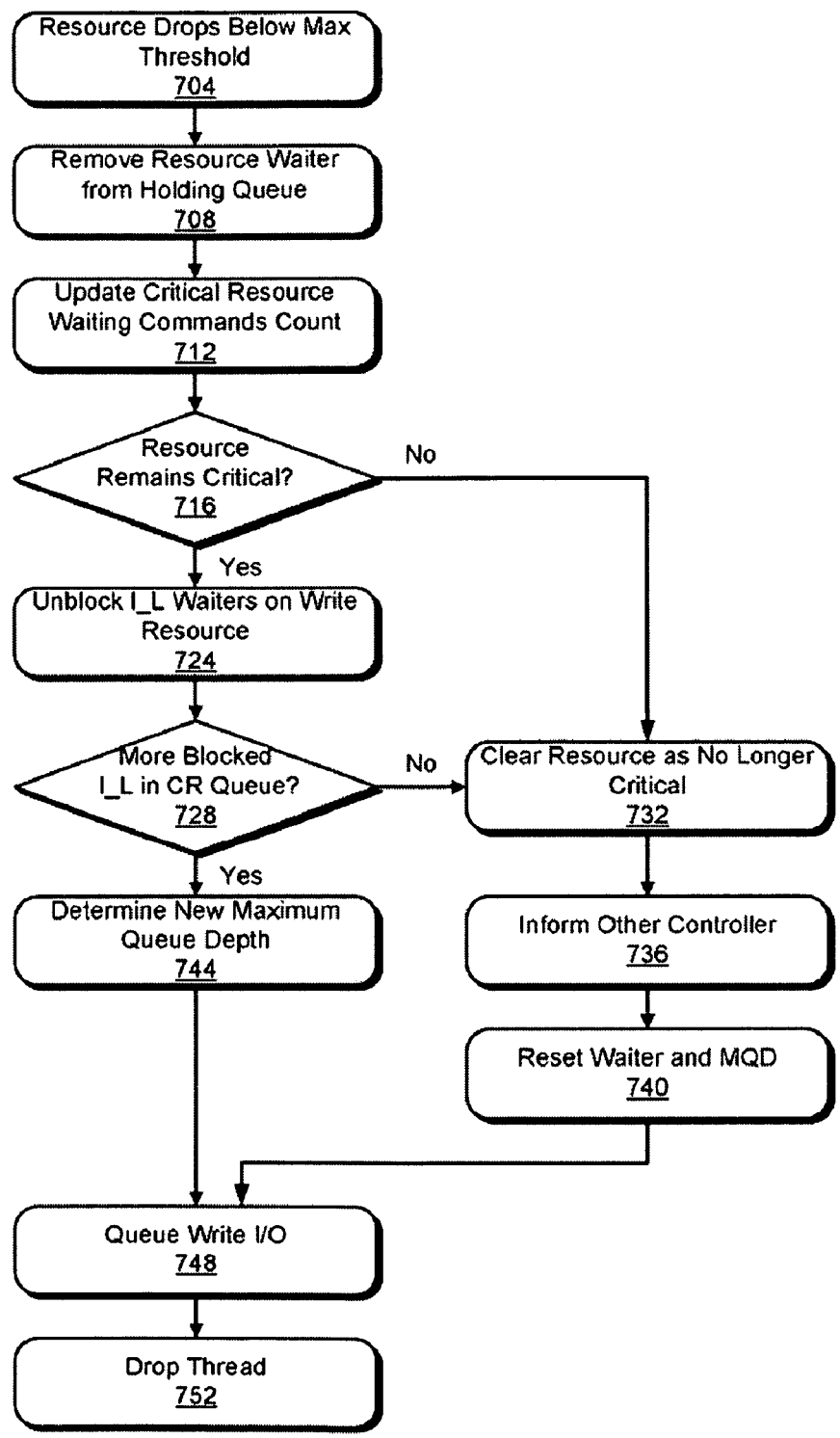

FIG. 7 is a flowchart illustrating operations in a method to manage resources when usage of a resource drops below a threshold. Referring to FIG. 7, in operation 704 a particular resource drops below a maximum threshold set by the critical resource management system. At operation 708 the critical resource management system removes the waiter for the resource from the holding queue. At operation 712 the count of commands waiting for the critical resource is updated, i.e., decremented.

If, at operation 716, the resource is no longer critical then control passes to operation 732 and the resource is cleared as no longer critical. By contrast, if at operation 716 the resource remains critical and control passes to operation 724 and the initiator-logical unit waiters on the right resource are unblocked.

If, at operation 728, there are no more locked initiator-logical unit resources in the critical resource queue, and control passes to operation 732 and the resource is cleared as no longer critical. Control then passes to operation 736 and, in the context of redundant controllers, the controller informs the other controller that the resource is no longer designated as a critical resource. At operation 740 the waiter and the maximum queue depth for the resource are reset to zero. By contrast, is that operation 728 there are more blocked initiator-logical unit resources in the critical resource queue then control passes to operation 744 and a new maximum queue depth is determined for the specific queue. Control then passes to operation 748 and the right input output operation is queued to start from the top of the data flow process. At operation 752 to resource management thread is dropped.

Figure 8:
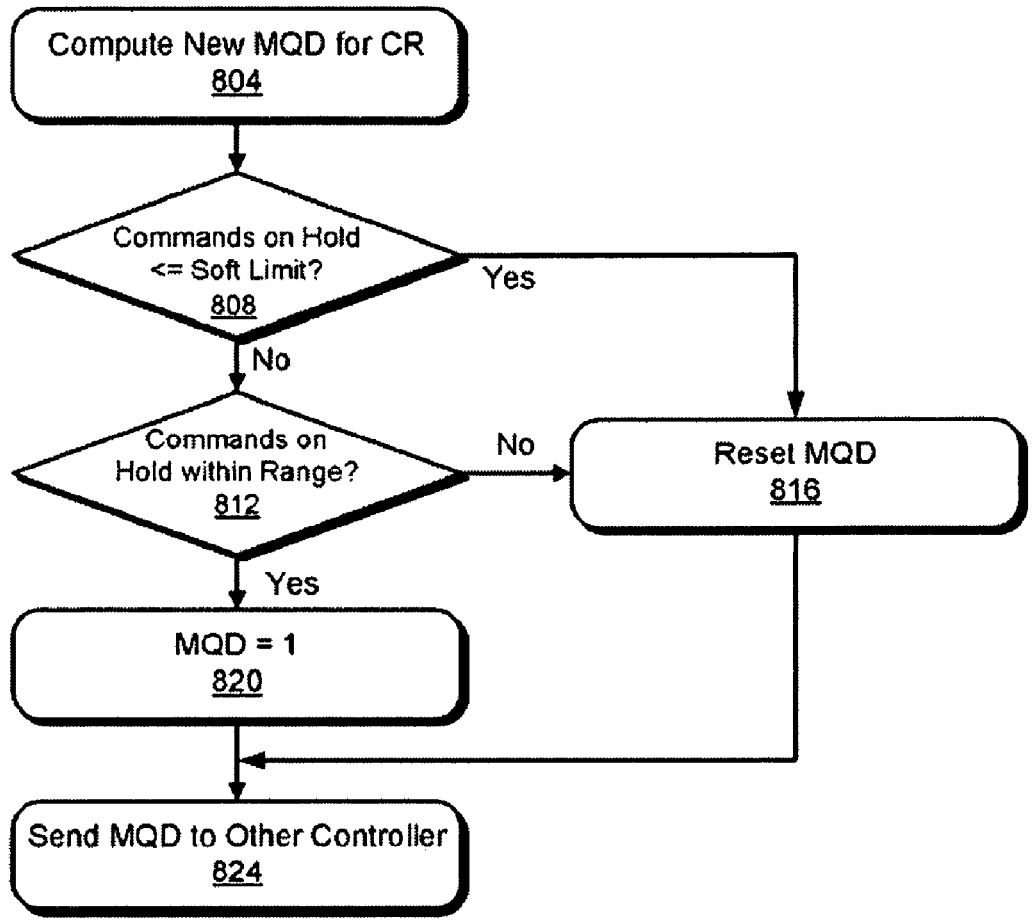

FIG. 8 is a flowchart illustrating operations in a method to determine a soft maximum queue depth for use in managing critical resources. Referring to FIG. 8, at operation 804 a call is invoked to compute a new maximum queue depth for a critical resource. If, an operation 808, the commands on hold for the resource are less than or equal to the soft limit calculated for the resource then control passes to operation 816 and the maximum queue depth is reset. In one embodiment, the maximum queue depth is reduced by dividing the available resources by the number of hosts waiting for the resources:

$$\text{MQD}_{new} = (CR_{max})/(\text{Blocked } I\_L\_L \text{ Count}) \quad \text{Equation (1)}$$

In the context of redundant controllers, control then passes to operation 824 and the newly calculated maximum queue depth is transmitted to the other controller in the redundant controller pair.

By contrast, if at operation 808 the commands on hold for the resource are not less than or equal to the soft limit calculated for the resource then control passes to operation 812. If, at operation 812 the commands on hold for the resource are not within a required range then control passes to operation 816 and the maximum queue depth is reset. In one embodiment, the maximum queue depth is reduced by the amount that the account or resources use exceeds the maximum allowed:

$$\text{MQD}_{new} = ((CR_{max}) - (\text{Commands on Hold}) - (CR_{max})/(\text{Blocked } I\_L \text{ Count}) \quad \text{Equation (2)}$$

In the context of redundant controllers, control then passes to operation 824 and the newly calculated maximum queue depth is transmitted to the other controller in the redundant controller pair.

By contrast, if, at operation 812 the commands on hold for the resource are not within a required range then control passes to operation 820 and the maximum queue depth is reset to 1. In the context of redundant controllers, control then passes to operation 824 and the newly calculated maximum queue depth is transmitted to the other controller in the redundant controller pair.

Thus, the systems and methods described herein enable a critical resource management system to implement soft limits on the use of critical resources. These soft limits may be exceeded temporarily to permit consumption of the resources by multiple host systems to balance, such that a single host, or initiator, is prevented from consuming most or all of the critical resources, thereby locking out other hosts, or initiators. Since the maximum queue depth is reduced with each additional initiator added to a waiting queue the number of outstanding commands is not permitted to greatly exceed the soft limit set by the critical resource management system. Also, in the context of redundant controllers information is shared between the master controller and the proxy controller. This permits a proxy controller to block input/output requests when a master controller is in a condition of shortage of critical resources.

Reference in the specification to "one embodiment" or "an embodiment" means that a particular feature, structure, or characteristic described in connection with the embodiment is included in at least an implementation. The appearances of the phrase "in one embodiment" in various places in the specification are not necessarily all referring to the same embodiment.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. For example, the illustrative resource management techniques may be implemented in any types of storage systems that are appropriate for such techniques, including any appropriate media. Similarly, the illustrative techniques may be implemented in any appropriate storage system architecture. The task management techniques may further be implemented in devices other than storage systems including computer systems, data processors, application-specific controllers, communication systems, and the like.

What is claimed is:

1. A method of managing critical resource usage in a storage network comprising:
    receiving, in a storage controller, an input/output operation from a host, wherein the input/output operation identifies a storage unit;
    placing the input/output operation in a waiting queue;
    determining a maximum queue depth for at least one critical resource in the storage network required to execute the input/output operation against the storage unit, wherein determining the maximum queue depth for the at least one critical resource is based on a computation derived from an amount of availability of the at least one critical resource and a number of initiators waiting for the at least one critical resource; and
    blocking one or more subsequent input/output operations from the host for the storage unit when the waiting queue for the critical resource exceeds the maximum queue depth.

2. The method of claim 1 wherein blocking the one or more subsequent input/output operations from the host for the storage unit when the waiting queue for the at least one critical resource exceeds the maximum queue depth comprises transmitting to the host a message indicating that the one or more subsequent input/output operations have been blocked.

3. The method of claim 1, further comprising transmitting, by the storage controller, the maximum queue depth to a peer storage controller.

4. The method of claim 3, further comprising:
    receiving, in the peer storage controller, an input/output operation from the host that identifies the storage unit; and
    processing the input/output operation using the maximum queue depth.

5. The method of claim 1, further comprising:
    detecting a drop in usage of the at least one critical resource; and
    enabling one or more input/operations on the waiting queue that are to use the at least one critical resource in response to the detecting.

6. The method of claim 5, further comprising:
    enabling one or more subsequent input/output operations that are to use the at least one critical resource in response to the detecting.

7. The method of claim 1, wherein the computation comprises dividing the amount of availability of the at least one critical resource by the number of initiators waiting for the at least one resource.

8. The method of claim 7, wherein dividing the amount of availability of the at least one critical resource by the number of initiators produces a first value, and wherein determining the maximum queue depth further comprises setting the maximum queue depth to a second value that is based on a number of input/output operations on hold and the first value.

9. The method of claim 8, wherein determining the maximum queue depth comprises calculating the second value that is equal to the amount of availability of the at least one resource less the number of input/output operations on hold less the first value.

10. A storage controller, comprising:
    a processor;
    a memory module comprising logic instructions stored in a computer-readable medium which, when executed by the processor, configure the controller to:
    receive, in the storage controller, an input/output operation from a host, wherein the input/output operation identifies a storage unit;
    place the input/output operation in a waiting queue;
    determine a maximum queue depth for at least one critical resource in a storage network required to execute the input/output operation against the storage unit, wherein the maximum queue depth for the at least one critical resource is determined based on a computation derived from an amount of availability of the at least one critical resource and a number of initiators waiting for the at least one critical resource; and
    block one or more subsequent input/output operations from the host for the storage unit when the waiting queue for the critical resource exceeds the maximum queue depth.

11. The storage controller of claim 10, further comprising logic instructions stored on the computer-readable medium which, when executed, configure the controller to transmit to the host a message indicating that the one or more subsequent input/output operations have been blocked.

12. The storage controller of claim 10, further comprising logic instructions stored on the computer-readable medium which, when executed, configure the controller to transmit the maximum queue depth to a peer storage controller.

13. The storage controller of claim 10, further comprising logic instructions stored on the computer-readable medium which, when executed, configure the controller to:
  detect a drop in usage of the at least one critical resource; and
  enable one or more input/operations on the waiting queue that are to use the at least one critical resource in response to the detecting.

14. The storage controller of claim 13, further comprising logic instructions stored on the computer-readable medium which, when executed, configure the controller to:
  enable one or more subsequent input/output operations that are to use the at least one critical resource in response to the detecting.

15. The storage controller of claim 10, wherein the computation comprises dividing the amount of availability of the at least one critical resource by the number of initiators waiting for the at least one resource.

16. The storage controller of claim 15, wherein dividing the amount of availability of the at least one critical resource by the number of initiators produces a first value, and wherein the maximum queue depth is determined by further setting the maximum queue depth to a second value that is based on a number of input/output operations on hold and the first value.

17. The storage controller of claim 16, wherein the maximum queue depth is determined by calculating the second value that is equal to the amount of availability of the at least one resource less the number of input/output operations on hold less the first value.

18. A computer program product comprising logic instructions stored in a computer-readable medium which, when executed by a processor in a storage controller, configure the controller to:
  receive, in the storage controller, an input/output operation from a host, wherein the input/output operation identifies a storage unit;
  place the input/output operation in a waiting queue;
  determine a maximum queue depth for at least one critical resource in a storage network required to execute the input/output operation against the storage unit, wherein determining the maximum queue depth for the at least one critical resource is based on a computation derived from an amount of availability of the at least one critical resource and a number of initiators waiting for the at least one critical resource; and
  block one or more subsequent input/output operations from the host for the storage unit when the waiting queue for the critical resource exceeds the maximum queue depth.

19. The computer program product of claim 18, further comprising logic instructions stored on the computer-readable medium which, when executed, configure the controller to transmit to the host a message indicating that the one or more subsequent input/output operations have been blocked.

20. The computer program product of claim 18, further comprising logic instructions stored on the computer-readable medium which, when executed, configure the controller to transmit the maximum queue depth to a peer storage controller.

21. The computer program product of claim 20, further comprising logic instructions stored on the computer-readable medium which, when executed, configure the peer storage controller to:
  receive an input/output operation from the host that identifies the storage unit; and
  process the input/output operation using the maximum queue depth.

22. The computer program product of claim 18, further comprising logic instructions stored on the computer-readable medium which, when executed, configure the controller to:
  detect a drop in usage of the at least one critical resource; and
  enable one or more input/operations on the waiting queue that are to use the at least one critical resource in response to the detecting.

23. The computer program product of claim 18, wherein the computation comprises dividing the amount of availability of the at least one critical resource by the number of initiators waiting for the at least one resource.

24. The computer program product of claim 23, wherein dividing the amount of availability of the at least one critical resource by the number of initiators produces a first value, and wherein determining the maximum queue depth further comprises setting the maximum queue depth to a second value that is based on a number of input/output operations on hold and the first value.

25. The computer program product of claim 24, wherein determining the maximum queue depth comprises calculating the second value that is equal to the amount of availability of the at least one resource less the number of input/output operations on hold less the first value.

* * * * *

UNITED STATES PATENT AND TRADEMARK OFFICE
CERTIFICATE OF CORRECTION

| | | |
|---|---|---|
| PATENT NO. | : 7,925,805 B2 | |
| APPLICATION NO. | : 12/258052 | |
| DATED | : April 12, 2011 | |
| INVENTOR(S) | : George Shin et al. | |

It is certified that error appears in the above-identified patent and that said Letters Patent is hereby corrected as shown below:

In column 16, line 23, in Claim 5, delete "input/operations" and insert -- input/output operations --, therefor.

In column 17, line 13, in Claim 13, delete "input/operations" and insert -- input/output operations --, therefor.

In column 18, line 31, in Claim 22, delete "input/operations" and insert -- input/output operations --, therefor.

Signed and Sealed this
Twenty-seventh Day of September, 2011

David J. Kappos
*Director of the United States Patent and Trademark Office*